United States Patent
Noel et al.

(10) Patent No.: US 8,997,261 B2
(45) Date of Patent: Mar. 31, 2015

(54) PROCESSES FOR SURFACE MEASUREMENT AND MODIFICATION BY SCANNING PROBE MICROSCOPY FUNCTIONING IN CONTINUOUS CURVILINEAR MODE, SCANNING PROBE MICROSCOPE AND DEVICE PERMITTING THEIR IMPLEMENTATION OF SAID METHODS

(75) Inventors: Olivier Noel, Neuville sur Sarthe (FR); Pierre-Emmanuel Mazeran, Compiegne (FR); Hussein Nasrallah, Le Mans (FR)

(73) Assignees: Centre National de la Recherche Scientifique-CNRS, Paris (FR); Universite du Maine (Le Mans), Le Mans Cedex (FR)

( * ) Notice: Subject to any disclaimer, the term of this patent is extended or adjusted under 35 U.S.C. 154(b) by 18 days.

(21) Appl. No.: 13/695,685

(22) PCT Filed: May 5, 2011

(86) PCT No.: PCT/FR2011/051024
§ 371 (c)(1),
(2), (4) Date: Nov. 1, 2012

(87) PCT Pub. No.: WO2011/138564
PCT Pub. Date: Nov. 10, 2011

(65) Prior Publication Data
US 2013/0047302 A1 Feb. 21, 2013

(30) Foreign Application Priority Data
May 7, 2010 (FR) .................................. 10 53610

(51) Int. Cl.
*G01Q 60/26* (2010.01)
*G01Q 60/28* (2010.01)
*B82Y 35/00* (2011.01)

(52) U.S. Cl.
CPC ............... *G01Q 60/26* (2013.01); *G01Q 60/28* (2013.01); *B82Y 35/00* (2013.01)
USPC ......... 850/34; 850/5; 850/21; 850/33; 850/35

(58) Field of Classification Search
CPC ..... G01Q 80/00; G01Q 60/34; G01Q 10/065; G01Q 40/00; G01Q 70/02; G01Q 70/06; G01Q 20/00; G01Q 60/24; G01Q 60/363
USPC ....................................... 850/5, 21, 33, 34, 35
See application file for complete search history.

(56) References Cited

U.S. PATENT DOCUMENTS

| | | |
|---|---|---|
| 6,169,281 B1 | 1/2001 | Chen et al. |
| 2007/0272005 A1 | 11/2007 | Abe et al. |
| 2010/0154086 A1* | 6/2010 | Henderson et al. ............. 850/33 |

FOREIGN PATENT DOCUMENTS

EP 0674170 9/1995

OTHER PUBLICATIONS

Binnig et al., "Atomic Force Microscope," Physical Review Letters,56(9):930-933 (1986).

(Continued)

*Primary Examiner* — Nicole Ippolito
*Assistant Examiner* — Hanway Chang
(74) *Attorney, Agent, or Firm* — McAndrews Held & Malloy, Ltd.

(57) ABSTRACT

The invention relates to processes for the modification of surfaces and on processes for the measurement of adhesion forces and of different forces of interaction (friction forces, adhesion forces) by scanning probe microscopy functioning in continuous <<curvilinear>> mode, as well as to a scanning probe microscope and a device permitting the implementation of said processes.

44 Claims, 5 Drawing Sheets

(56) References Cited

OTHER PUBLICATIONS

International Search Report and Written Opinion in PCT/FR2011/051024 dated Jul. 5, 2011.

Mazeran et al., "Normal and lateral modulation with a scanning force microscope, an analysis: Implication in quantitative elastic and friction imaging," Tribology Letters, 7(4):199-212 (1999) XP002398003.

* cited by examiner

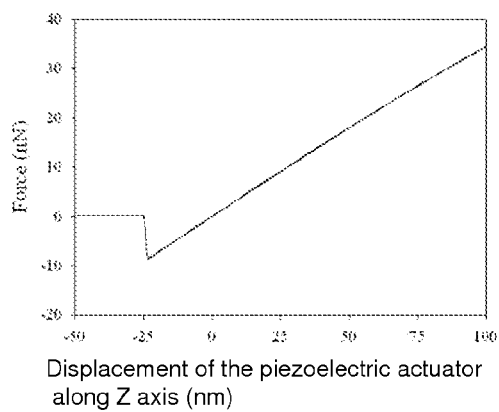
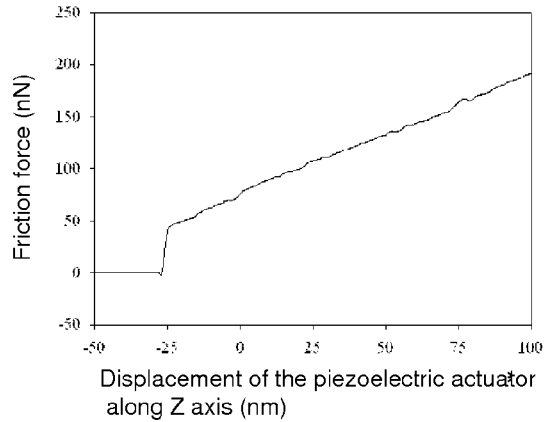
Figure 7a
Figure 7b
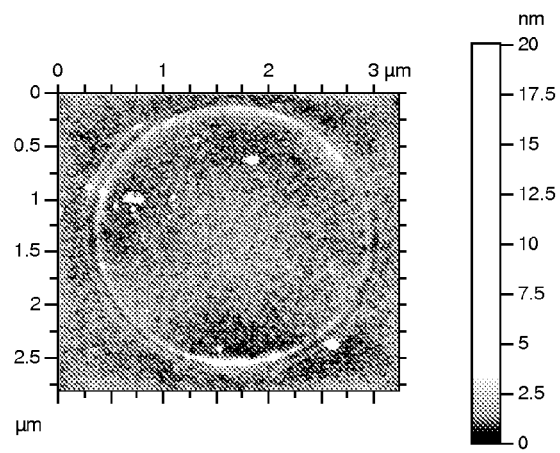
Figure 8

PROCESSES FOR SURFACE MEASUREMENT AND MODIFICATION BY SCANNING PROBE MICROSCOPY FUNCTIONING IN CONTINUOUS CURVILINEAR MODE, SCANNING PROBE MICROSCOPE AND DEVICE PERMITTING THEIR IMPLEMENTATION OF SAID METHODS

The present application is filed pursuant to 35 U.S.C. 371 as a U.S. National Phase application of International Patent Application No. PCT/FR2011/051024, which was filed May 5, 2011, claiming the benefit of priority to French Patent Application No. 1053610, which was filed on May 7, 2010. The entire text of the aforementioned applications is incorporated herein by reference in its entirety.

FIELD OF THE INVENTION

The invention relates to processes for surface measurement and modification by scanning probe microscopy functioning in continuous curvilinear mode. It also relates to a scanning probe microscope permitting the implementation of said surface measurement and modification processes, as well as a device permitting the implementation of said processes, said device being adaptable on any type of scanning probe microscope.

PRIOR ART

In contrast to Scanning Tunneling Microscopy (STM) which remains limited to the study of conductive materials, AFM not only enables the study of conductive materials but also the study of non-conductive materials such as polymers, ceramics, biological materials and this in different environments (ambient, gaseous, liquid, corrosive, inert, at different temperatures, at controlled humidity level) and without any particular preliminary preparation of the sample.

Since his invention in 1986 (Binnig and Al. Phys. Lett. 56(9), 930; 1986), the atomic force microscope (or <<AFM>>: Atomic Force Microscopy) has become one of the techniques which cannot be ignored in order to measure forces with a piconewton resolution and/or to image the surface topography of a sample with a nanometric resolution.

The AFM principle is based on the measure of the different interaction forces between a very fine tip, the extremity of which being ideally atomic fixed to the extremity of a lever arm called cantilever and the surface of a material.

An AFM operates by following three principal regimes, namely:
- the contact mode: the tip is very close to the surface of the sample (a few angstroms), the repulsive forces dominate because of the steric repulsion;
- the non contact mode: the cantilever oscillates around the surface of the sample around its resonance frequency at a low amplitude in the range of a few nm. It is the attractive forces that dominate (Van der Waals forces, magnetic, electrostatic . . . );
- the tapping mode: the cantilever oscillates around its resonance frequency at a sufficiently large amplitude in the range of 20 nm; the tip moving through the attractive then repulsive field of the surface of the sample and therefore only periodically come into contact with the surface of the sample.

The interactions of the tip with the sample induce a variation of the vibration amplitude or a very low deflection (in the range of a few picometers to a few hundreds of nanometers at most) of the cantilever. This deflection is generally detected by an optical system constituted by a laser beam reflecting on the extremity of the cantilever and whose path is guided with the help of mirrors and then captured by a photodetector.

Accordingly, when a surface is scanned by a tip, the instant variations in the vibration amplitudes or the normal deflections and/or lateral torsions of the cantilever are detected with the help of the optical system, and it is possible to realize the topographical image of the surface.

In the present invention, the unit constituted by the cantilever and the tip is hereinafter called <<probe>>. The cantilever is inclined in relation to the horizontal plan of the sample and the probe is fixed to the microscope via a probe holder.

The terms <<surface>> and <<surface sample>> are used indifferently in the present invention.

The sample to be analyzed is placed on a sample holder.

According to the AFM configuration, the probe holder or sample holder are placed in movement with the help of three actuators (typically piezoelectric ceramics) constituted by a rigid tube, electrical tensions being applied onto the actuators in order to obtain displacements in the different space directions.

According to the invention, the orthonormal coordinate system (XYZ) is used in which the X, Y and Z-axes are defined as being the displacement axes of the actuator permitting the displacement of the probe holder or the sample holder.

The coordinates (x,y,z) of the orthonormal coordinate system (X,Y,Z) are referred to in order to define the position in space.

There exist different commercial configurations of the atomic force microscope: either the probe holder is immovable while the sample holder is placed in movement, or the sample holder is immovable while the probe holder is in movement.

Classically, the AFM measures are obtained by two functional modes:
- the imagery mode in which the probe scans the sample surface horizontally in the (XY) plan. This operating mode enables one to gain access to images characterizing a magnitude, generally the topography, in function of the x, y, z position of the sample surface. It is also possible to gain access to physical magnitudes such as for example, the topography, the friction forces during a one-dimensional (as per the direction X or Y) lateral cyclic scanning on nanometric or even micrometric distances;
- the force spectrography mode, enabling one to generate an "approach-withdrawal" force curve in which one imposes to the probe approach and withdrawals cycles in relation to the sample surface in the Z direction of the actuator, while measuring the interaction between the tip and the sample surface. In AFM, a force spectrum representing the interaction force value between the tip and the sample in relation to the displacement of the actuator in the Z axe is obtained. This mode enables one to gain local access to adhesion and/or attraction forces, as well as to the elastic properties of the sample.

This mode is used in biomedical research in order to measure the interactions between molecules (ligand/receptor, antibody/antigen, DNA/protein).

Technical Problem

In imagery or force spectrography mode, the classic systems present disadvantages.

Indeed, when the tip comes into contact with the sample surface, a nano capillary condensation meniscus due to the air humidity and to the surface hydrophily can form between the tip and the surface, typically for contact times close and above the millisecond. The de Laplace depression in this capillary condensation meniscus generates an adhesion force in the range of many dozens of nM, which is added to the support force generated by the bending or the cantilever. The result is that it is practically impossible in the mode called contact of working with a lower support force than the capillary force, which renders this imaging mode particularly degrading for the sample surface.

Moreover, the adhesion force measured during the force spectrums is linked not only to the interaction forces between the tip and the sample, but also to the capillary adhesion force. It is therefore not possible to measure certain interaction forces such as magnetic, Van der Walls or electrostatic forces without being disturbed by these capillary forces.

Furthermore, in the case of the measurement of a specific magnitude, in relation to the x-y position, the cyclic scanning imposed on the probe holder (or to the sample holder) does not permit the latter of being displaced at a constant linear speed, notably at the lap-back points of the cycle due to a momentary stop before the return. Thus, the measurements of this magnitude are not made at a constant speed during the measurement period, the stationary state is therefore sometimes impossible to observe. As an example, during the friction force measurement, a capillary condensation meniscus is susceptible of forming during the stop time and to disappear during the slippage generating a total non-constant force thereby altering the measurement.

Consequently, a liquid or a controlled humidity or a ultra-high vacuum environment is necessary in order to neutralize the supplementary interaction forces due to the formation of the capillary condensation meniscus.

It would therefore be advantageous to be able to realize the measurements free of the capillary condensation phenomenon while still working in ambient conditions.

SUMMARY OF THE INVENTION

The present inventors have found that this was possible by imposing during the measurement process a curvilinear continuous relative displacement of the probe in relation to the sample surface to be analyzed, sample which is disposed on the sample holder.

Advantageously, the curvilinear continuous relative movement is uniform. The measurements may therefore be done at a constant speed without any stop time, in other words by reaching a stationary state.

According to the invention, by "continuous" movement, it is meant a movement that does not undergo an off time.

By "uniform" movement, it is meant a movement whose speed does not undergo brutal variations (derivable speed in every point).

By "curvilinear" movement or "curvilinear" mode, it is meant any movement generated by the application of two harmonic tension Vx(t) and Vy(t) (or also called X and Y tensions) composed of sinusoid tensions of frequency f and of its harmonics i·f (with i integer) of respective amplitudes $A_i$ and $A'_i$; said harmonics of tensions X and Y being phase shift one from the other by an angle cp. According to the invention, the tensions are defined as follows:

$$Vx(t) = \sum_{i=1}^{n} A_i \cos(i.\omega.t + \Phi_i)$$

$$Vy(t) = \sum_{i=1}^{n} A'_i \cos(i.\omega.t + \Phi'_i)$$

where ω is an angular frequency equal to 2π multiplied by the frequency f;

$A_i$ and $A'_i$ are the respective amplitudes of the different harmonics of the tensions Vx(t) and Vy(t).

$\Phi_i$ and $\Phi'_i$ are the respective phase shifts of harmonics i of tensions Vx(t) and Vy(t).

The circular movement or the elliptical movement are particular cases of the curvilinear movement.

By "relative" movement between the probe holder and the sample holder, it either means a movement of the probe holder while the sample holder is still, or a movement of the sample holder while the probe holder is still.

By misuse of language, we will sometime say probe displacement and sample displacement.

According to the present invention, it is considered that the sample to be analyzed presents a surface appreciably plane at the macroscopic scale. This sample presents of course a roughness at the nanometric scale.

The invention will better understood by reading the following description and referring to the figures, on which:

FIGS. 7a and 7b represent the simultaneous acquisition of the adhesion force (minimal value of curve 7a) and of the friction force (the slope indicated on FIG. 7b enables one to directly obtain the friction coefficient) at a given slide speed and illustrate example 2 of the present invention.

FIG. 8 is a topographic image highlighting the surface modification made by the wear linked to the application of the continuous curvilinear movement according to the invention.

Figure 1:
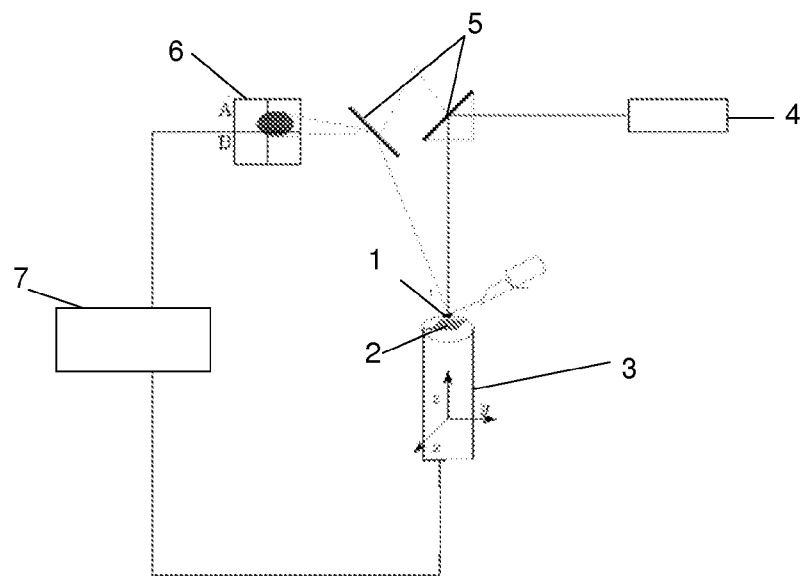
FIG. 1 is a schematic illustration of the general operating principle of a conventional AFM in which the probe holder is still and the displacements along the X, Y and Z-axes are done at the level of the sample holder.

The principle of the AFM (FIG. 1) consists in scanning the surface sample 1 with the probe 2, with the piezoelectric ceramic 3. The measurement of the interaction forces exerted on the tip of the probe is made through a laser beam 4 focused on top of the tip. The reflection of this laser signal by mirrors 5 is then collected on a detector constituted by four photo-electric cells 6. It is this position on the detector that will permit the quantification of the normal or lateral deflection of the cantilever with a resolution in the range of the piconewton.

This position will serve as a reference to detect either attractive forces or repulsive forces or even friction forces through lateral displacements of the spot on the cells.

A retroaction loop 7 enables one to realize a topographic image of the surface, either by maintaining the probe at a constant distance in relation to the sample surface, or by imposing a constant interaction of the cantilever, during the scanning of the surface. It is also possible to suppress the horizontal scanning (following the X and Y axes) and to realize a vertical scan (following the Z axe), in other words approach and withdrawal cycles of the probe holder in relation to the sample. In this measurement mode of the forces, without horizontal scanning, the retroaction loop is not used. The deflection of the cantilever is thus measured at a specific point of the sample at different separation distances and more precisely for a displacement of the actuator in the Z direction.

During classic measurements, the XY displacement plane of the actuator is slightly inclined in relation to the sample surface, in other words, the horizontal scanning is not done in the plane of the sample.

The devices in the prior art may be provided with a module permitting an access to signals which enable a specific steering of the piezoelectric ceramic, in the three space direction X,Y,Z.

According to the type of configuration of the AFM, the means permitting the displacement are the piezoelectric actuators of the probe holder or the sample holder.

The inventors have discovered that by generating a relative uniform curvilinear movement between the probe holder and the sample enables one to access the data at constant displacement speed, without acceleration or deceleration, without any stop time and without any abrupt variation of the displacement direction during the whole measurement period.

An object of the invention is thus a measurement process by scanning probe microscopy, in which the sample holder and the probe holder are in relative uniform curvilinear movement.

This process therefore enables on to avoid the phenomenon induced by the abrupt change in the displacement direction that is found in the classic mode of scanning by coming and going. For example, in contact mode, the scanning in coming and going mode can provoke during the time necessary for the inversion of the scanning direction an abrupt change of the shearing stresses, of the elastic and plastic deformations, of the contact temperature, of the adhesion forces, etc. . . . resulting in a non-stationary state of the interaction of the probe and the sample.

Moreover, the curvilinear mode when it is used without retroaction enables one to reach displacement speed in the XY plane that are largely superior, with a factor of at least three decades, to the values presently available by playing on the possibility of working with high frequency supply tensions of the actuator. In the device developed by the inventors, it is possible to reach speeds in the range of 100 mm·s$^{-1}$, but speed even more important may be reached by using piezoelectric actuators capable of generating displacements at very high frequencies (MHz and GHz). This is particularly pertinent in the case of surface modifications as described in the present invention, since it is possible to realize these modifications at higher speeds than those of the prior art.

The important speed of the continuous curvilinear movement of the probe will prevent the formation of the capillary condensation meniscus and thus permit the simultaneous measurement of the interaction forces as a function of the slide speed, free of the different problems discussed previously.

The process according to the invention is applicable to any scanning probe microscope (or close field) such as the Scanning Tunneling Microscopy (STM) or the Scanning Near Optical Microscopy (SNOM) and all members of the Scanning Probe Microscopy (SPM) family.

DETAILED DESCRIPTION OF THE INVENTION

Processes

According to a first embodiment, the process of the invention is a measurement process by scanning probe microscopy comprising the following steps:

(a) to approach a surface of a sample to be analyzed with a tip of a probe for scanning probe microscopy;

(b) to put in relative continuous curvilinear movement said surface of the sample relative to the probe in the plane of the surface of the sample to be analyzed;

(c) to detect the interactions exerted between said surface of the sample to be analyzed and said tip for scanning probe microscopy.

This process is particularly adapted to atomic force microscopy.

Thus, the invention also concerns a measurement process by atomic force microscopy comprising the following step:

(a) to approach a surface of a sample to be analyzed with a probe for atomic force microscopy;

(b) to put in relative continuous curvilinear movement said surface of the sample relative to the probe in the plane of the surface of the sample to be analyzed;

(c) to detect the lateral forces induced by the friction forces exerted between said surface of the sample to be analyzed and said tip for atomic force microscopy.

The measurements obtained by the implementation of the processes previously described enable one to determine the tribological properties of the analyzed surface such as for example the evolution of the friction forces as a function of the speed of the curvilinear movement.

According to a second embodiment, the process of the invention is a measurement process by scanning probe microscopy comprising the following step:

(a) to approach a surface of a sample to be analyzed with a tip of a probe for scanning probe microscopy;

(b) to put in relative continuous curvilinear movement the surface of the sample relative to the tip while applying to said surface another relative movement along the Z axis, said movement being appreciatively normal to the surface of the sample;

(c) to detect the interactions forces exerted between said surface of the sample to be analyzed and said tip for scanning probe microscopy.

This second process is particularly adapted to atomic force microscopy.

Thus, the invention also concerns a measurement process by atomic force microscopy comprising the following steps:

(a) to approach a surface of a sample to be analyzed with a tip of a probe for atomic force microscopy;

(b) to put in relative continuous curvilinear movement the surface of the sample relative to the tip while applying to said surface another relative movement along the Z axis, said movement being appreciatively normal to the surface of the sample;

(c) to detect the interactions forces exerted between said surface to be analyzed and said tip for atomic force microscopy thereby enabling one to access the adhesion forces during the withdrawal of the tip towards the surface or inversely and/or the friction forces as a function of the normal forces imposed during the approach-withdrawal cycles and when the tip is in contact with the surface of the sample.

It is thus possible to establish force curves thanks to the measurements of the adhesion forces without the forces linked to the capillary condensation meniscus.

Moreover, it is also possible to vary the slide speed, in other words the displacement speed of the surface in relation to the tip, and thus measure the adhesion force as a function of the slide speed.

Furthermore, the process previously described implements in a very advantageous fashion the coupling between the continuous relative curvilinear movement in the (XY) displacement plane of the actuator and the relative movement along the Z displacement axis of the actuator thus enabling the determination in a single measurement of a friction coefficient thanks to the simultaneous measurements of the friction forces for different normal force values, in contrast to the present process which necessitates multiple measurements in order to access the friction coefficient. Indeed, in the conventional configuration, a single measurement of the friction force is possible for an applied given normal force.

In the process of the invention, the variation of the normal force is simply induced by the approach and withdrawal of the tip on the surface of the sample and the friction forces generated by the relative movement when the probe and the sample are in contact are measured simultaneously thanks to the uniform curvilinear movement. A single approach-withdrawal cycle is thus necessary in order to trace the straight line representing the friction forces as a function of the imposed normal forces and to deduct the friction coefficient.

From a scientific point of view, it therefore becomes possible to establish a direct correlation between the variation in the friction coefficients, from the adhesion force and the presence of a capillary condensation meniscus. In order to do so, it is sufficient to make this measurement at different slide speed and to measure the friction coefficients and the adhesion forces.

It is also possible according to the invention to make a mapping of the force curves, the friction curves or the friction coefficients curves by adding the following steps to the previously described processes:

(d) after step c) displace the probe or the sample to another coordinate (x,y) with the help of the piezoelectric actuators;

(e) repeat steps a), b) and c)

(f) eventually repeat steps (d) and (e)

According to an embodiment, the sample holder and the probe holder are in continuous relative curvilinear uniform movement during the measurement process.

According to a preferred embodiment, the curvilinear movement is a circular movement.

According to another embodiment, the surface of the sample is adjusted along the X and Y directions, in order for the surface of the sample to be parallel to the displacement plane of the actuator.

According to another embodiment, the probe vibrates around its resonance frequency during the whole measurement (non-contact mode or intermittent contact).

According to the invention, the sample to be analyzed may be conductive or insulating.

During the measurements, at least the surface to be analyzed and the tip for scanning probe microscopy, notably for atomic force microscopy may be immerged in a liquid medium.

The measurements obtained with the help of the processes previously described will permit a rapid development of a rigorous and reproducible metrology and might be inescapable in new measurement norms at the nanometric scale.

The processes of the invention also permit the provocation of surface modifications by putting in relative curvilinear relative movement the tip in relation to the surface to be modified during important lengths of time and by varying or not the normal forces applied along the Z direction during the whole surface modification process.

Scanning Probe Microscope

Another object of the invention concerns a scanning probe microscope that permits the implementation of the processes previously described.

According to the invention, the scanning probe microscope comprises a probe constituted by a cantilever and a tip, said probe being linked to the microscope via a probe holder, a sample holder and means permitting the relative displacement of the sample holder in relation to the probe holder. During the measurement, the displacement means generate the relative continuous curvilinear movement between the sample holder and the probe holder.

According to a preferred embodiment, the scanning probe microscope is an atomic force microscope.

The invention may be applied whatever the scanning probe microscope configuration. In other words, said displacement means of the scanning probe microscope of the invention help generate the curvilinear movement of the sample holder or the probe holder.

The scanning probe microscope also comprises displacement means that help generate the relative movement along the Z axis between the probe and the sample holder, said movement being normal at the free end of the sample holder; which enables one to execute approach-withdrawal cycles while scanning the surface of the sample to be analyzed with a continuous curvilinear movement.

As mentioned previously, it is therefore possible with the atomic force microscope of the invention, for a identical slide speed in curvilinear mode, to simultaneously measure the adhesion forces and the friction forces as a function of the different normal forces induced at the moment of probe-sample contact and to thus determine the friction coefficient.

The electronics associated with a commercial AFM enables one, among other things, to command the Z-axis, and thus enables one to vary the normal force applied by the probe on the sample in order to realize force curves.

This electronic may be used in the atomic force microscope of the invention.

Consequently, the atomic force microscope of the invention not only permits the implementation of the measurement processes in continuous curvilinear mode without approach-withdrawal (measurement of the friction forces), but also the measurement processes in continuous curvilinear mode with approach-withdrawal (measurement of adhesion forces or simultaneous measurement of the adhesion forces and the friction forces as a function of the normal forces) while being free of the capillary condensation phenomenon or any modification of the nature of the inherent contact of stop times during the measurement.

According to another embodiment, the atomic force microscope of the invention helps one adjust the sample in order for the continuous curvilinear movement to be done in the plane of the sample, in other words that the continuous curvilinear movement does not generate modifications in the distance along the Z-axis between the sample holder and the probe holder. The interaction between the probe and the sample (flexion of the cantilever for example) will therefore be constant. This permits to be free from interaction variations that lead to oscillations on the tracing of the curves.

Different means are possible in order to adjust the sample:
a mechanical adjustment is made with the help of a micrometric position table including angular adjustments in X and Y; or
a control system is used in order to maintain a constant height; or
a tension is given on the Z-axis on the actuator in order to generate a displacement along the Z-axis compensating the slope of the sample, said tension $V_z$ being equal to the sum of two harmonic tensions similar to the $V_x$ et $V_y$ tensions sent to the actuator along the X and Y-axis, but at different amplitudes and being defined as follows: $Vz(t)=aVx(t)+bVy(t)$ where a and b are coefficients.

In a particular embodiment, the displacement means are the piezoelectric actuators of the probe holder or the sample holder depending on the configuration of the microscope.

As in the classic devices, the microscope according to the invention may be provided with an access module to signals permitting a specific steering of the piezoelectric ceramic in the three directions X, Y, Z.

The present invention exploits in a very advantageous fashion this possibility in order to generate the relative continuous curvilinear movement between the probe and the sample by the application on the displacement means of two harmonic tensions Vx(t) and Vy(t) (or also called X and Y tensions) composed of sinusoid tensions of frequency f and of its harmonics i·f (with i integer) of respective amplitudes $A_i$ and $A'_i$; said harmonics of tensions X and Y being phase shift one from the other by an angle $\phi$. According to the invention, the tensions are defined as follows:

$$Vx(t) = \sum_{i=1}^{n} A_i \cos(i.\omega.t + \Phi_i)$$

$$Vy(t) = \sum_{i=1}^{n} A'_i \cos(i.\omega.t + \Phi'_i)$$

where $\omega$ is a pulsation equal to $2\pi$ multiplied by the frequency f;

$A_i$ and $A'_i$ are the respective amplitudes of the different harmonics of the tensions Vx(t) and Vy(t).

$\Phi_i$ and $\Phi'_i$ are the respective phase shifts of harmonics i of tensions Vx(t) and Vy(t).

According to an embodiment, it is possible to vary the displacement speed by playing on the frequency and/or the amplitudes of the tensions or tension couples.

According to another embodiment, the tensions given are simple sinusoid tensions.

Furthermore, it is possible to apply an optimal composition of command tensions on each of the axis. Indeed, as an example, in considering the X-axis, the composition of two tensions of equal value and respectively opposed for −X and +X, enables one to maximise a displacement on this axis. Consequently, the application of a +10 Volts tension to the piezoelectric ceramic commanding the displacements along the axis [−X; +X] and applied in −X and X, generates a displacement along [−X; +X] corresponding to a tension of 20 Volts applied solely along X on the piezoelectric ceramic.

It is for this reason, according to a preferred embodiment, that the relative continuous curvilinear movement between the probe and the sample is generated by the application on the displacement means of two electric harmonic tension couples in phase opposition [−X and +X] and [−Y and +Y] composed of sinusoid tensions of frequency f and of its harmonics i·f (with i integer), of amplitudes $A_i$ and $A'_i$ respectively, said harmonics of the couples [−X and +X] and [−Y and +Y] being phase shift by an angle $\phi$.

Figure 2A:
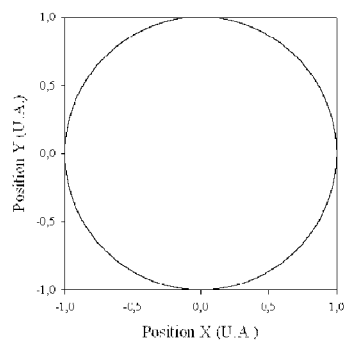
FIGS. 2b and 2c are representative curves of the possible steering tensions according to the invention as a function of time bringing about a circular movement at constant speed (FIG. 2a)
Figure 2B:
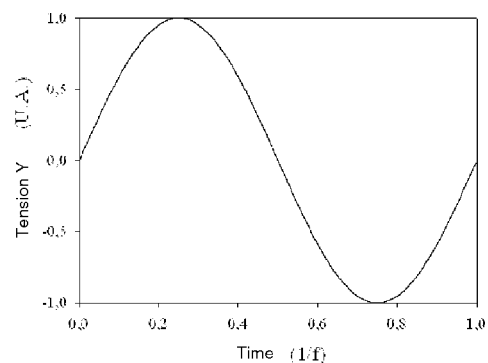
Figure 2C:
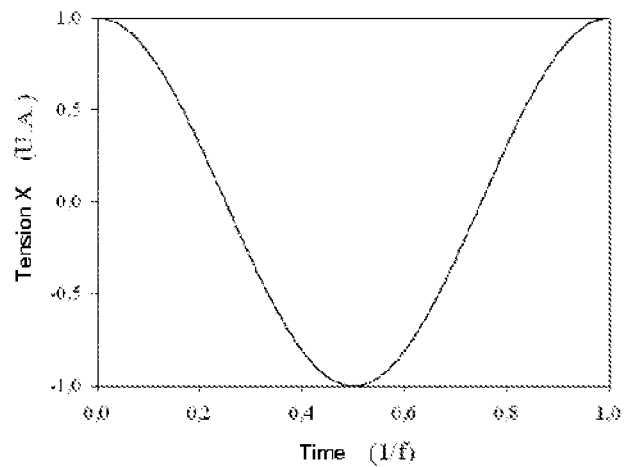
Figure 3A:
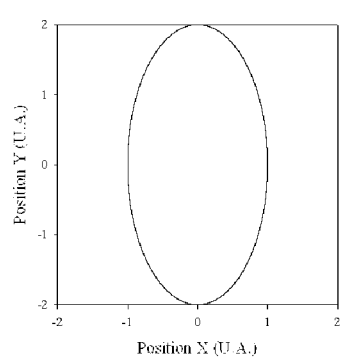
FIGS. 3b and 3c are representative curves of the possible steering tensions according to the invention as a function of time bringing about an elliptical movement at constant speed (FIG. 3a)
Figure 3B:
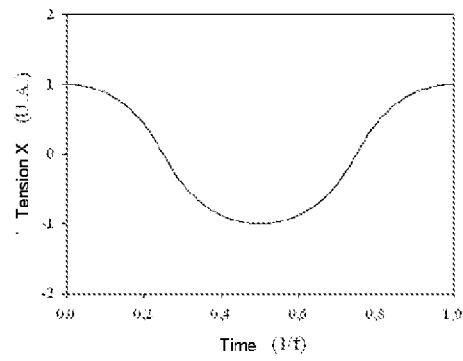
Figure 3C:
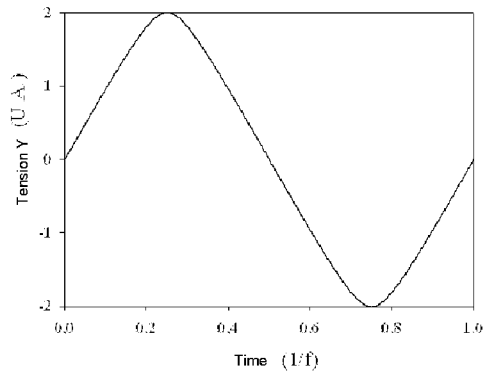
Figure 4A:
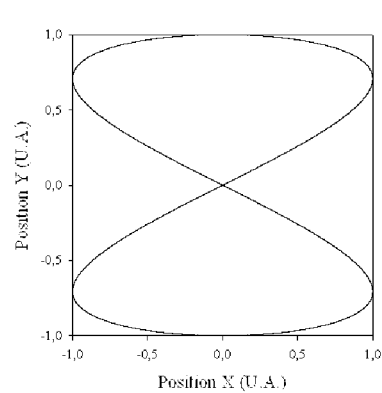
FIGS. 4b and 4c are representative curves of the possible steering tensions according to the invention as a function of time bringing about a curvilinear movement at constant speed (FIG. 4a)
Figure 4B:
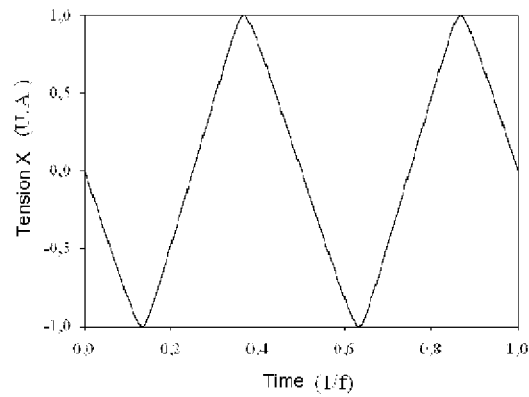
Figure 4C:
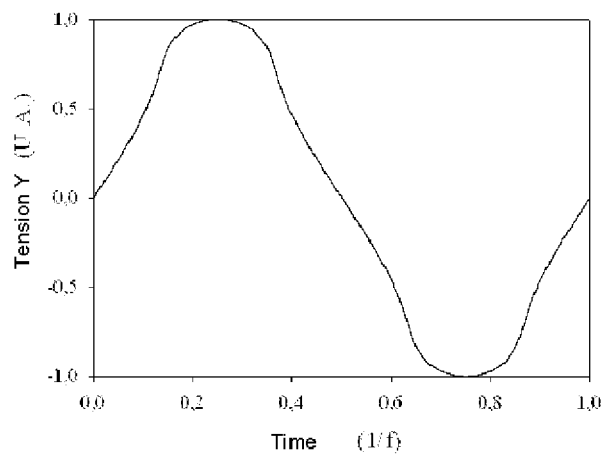

Steering sinusoid tensions are illustrated on FIGS. 2, 3 and 4 enabling the respective generation of circular, elliptical and curvilinear displacements at constant speed.

The tension amplitudes X, Y or tension couples to be delivered are necessarily strictly higher than 0V and lower than the nominal tension applicable to piezoelectric ceramics.

Preferably, the amplitudes $A_1$ and $A'_1$ of the first tension harmonic X, Y or of the tension couples [−X; +X] and [−Y; +Y] are comprised between 0.1V et 30V and even more preferably between 5V et 15V.

According to the invention the frequency f of the first harmonic tension X, Y or tension couples [−X; +X] and [−Y; +Y] to be delivered are strictly higher than 0V and lower than the double of the first resonance frequency of the piezoelectric actuator, preferably, they are comprised between 10 Hz et 1000 Hz.

According to the invention, the angle $\phi$ is comprised between 0.1° and 360° [2π] (modulo 2π).

According to a preferred embodiment of the invention, tensions X, Y or tension couples [−X; +X] and [−Y; +Y] are composed of a single harmonic which presents the same amplitude, the same frequency and phase shift by an angle $\phi$ equal to π/2[2π], generating therefore a circular movement.

According to the invention, the relative displacement along the Z-axis is generated by the application on the piezoelectric actuator of a triangular tension.

The displacement speed along the Z-axis will depend on the frequency and the amplitude of said tension.

The present invention therefore provides numerous technical and economic advantages.

Indeed, the atomic force microscope of the invention enables one to implement the measurement processes of local forces at the nanometric scale with a displacement speed that is rigorously constant and for unequalled values close or similar to those observed in reality in high technology applications (electromechanical microsystems, hard drives, nanosystems, etc.).

Adaptable Device

Another object of the invention concerns a device that is adaptable to any type of scanning probe microscope thereby permitting the implementation of the scanning probe microscope as described previously, which comprises means for controlling said means enabling the displacement.

Said control means are constituted by the application of the sinusoid harmonic tensions defined previously in the context of the scanning probe microscope.

Such a device may be connected directly and adapted to any type of scanning probe microscope available on the market.

Said device comprises the following elements:
a computer equipped with a card that permits the generation of numerical tensions and a software that enables the control of the parameters of the generated tensions and to make them vary according to the needs of the user in order to generate continuous curvilinear movements (A);
a digital-to-analog converter (B);
optionally, a tension inverter (C) in the case where the tension couples [−X; +X] and [−Y; +Y] are applied;
a module that helps get access to the signals or any other system that permits the application of electrical tensions to the piezoelectric actuators (D);
a synchronous detector (E);

optionally, a steering card (F) that enables one to steer the synchronous detector and recuperate the measured values.

According to an embodiment, elements (A), (B) and (C) may be advantageously replaced by one or several multi-exit tension generators that permit the generation of several tensions that are phase shift with respect to one another and to fix the amplitudes and the frequencies of said tensions.

Figure 5:
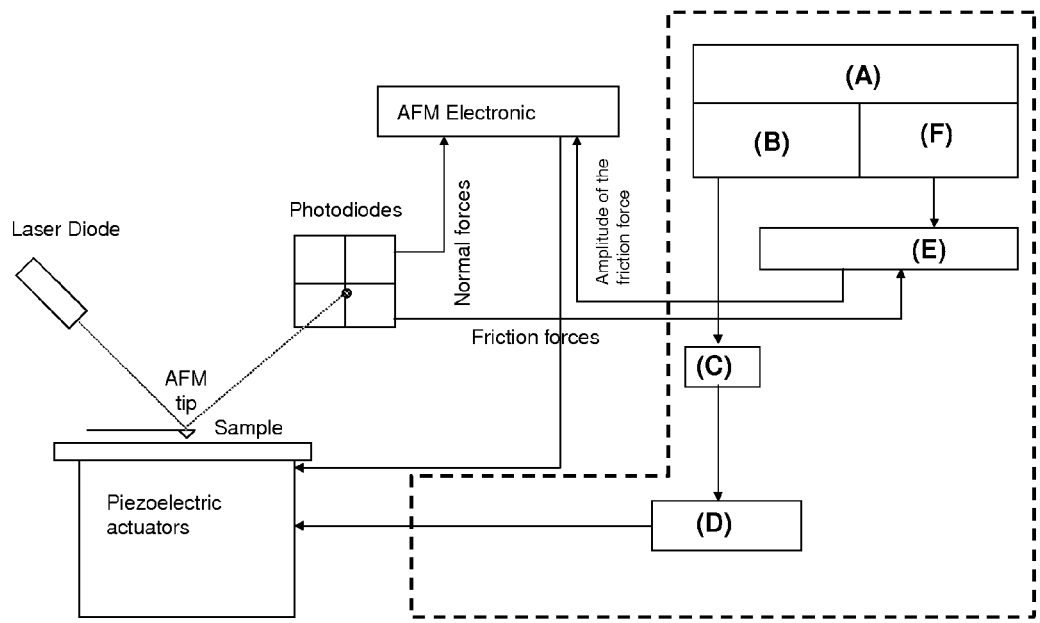
FIG. 5 represents the diagram of the general principle of the device according to the invention and its connexion to a AFM.

The montage of FIG. 5 comprises such a device and is susceptible of generating a curvilinear mode, and of simultaneously measuring, for example, the friction force as a function of the normal force applied and the adhesion force as a function of the slide speed and establish friction curves or force curves.

In the present invention, a computer equipped with a software permitting the generation of virtual, digital, phase shift tensions is used. The software needs drivers that permit the communication with the different components of the device.

One can for example use the Labview software in order to generate a virtual, sinusoidal tension couple of 10V to 100V.

Said digital signals are then converted in analog signals with the help of a digital-to-analog converter B.

The digital-to-analog converter is selected with regards to the amplitude of the tension to be delivered.

One can for example use as a digital-to-analog converter a DAC NI-PCI 6731 card from National Instruments.

According to a particular embodiment of the device according to the invention, it is also possible to use a generator of analog tensions in place of the software that permits the generation of virtual digital tensions and of the digital-to-analog converter.

According to a preferred embodiment, the analog signals exiting the converter B are then sent into a tension inverter C permitting the generation of four phase-shift tensions in [−X; +X] and [−Y; +Y].

These phase-shift steering tensions are at the origin of the important displacement speeds that can achieve the probe or the sample holder. Indeed, by considering a steering tension of which, for example, the frequency is fixed and the amplitude is increased, in order to keep a constant frequency, the rotation speed must necessarily increase.

These tensions are then sent via the module that helps get access to the signals (D) or any other system that permits the application of tensions to the piezoelectric actuators of the probe or the sample holder in order to generate curvilinear displacements along the X and Y-axis.

The amplitude signal of the normal forces is directly sent in the AFM electronic which permits the conversion of the analog data into digital data in order to exploit the results in graphs or mappings with levels of grey or colors.

As for the friction force signal, it is sent onto the synchronous detector (E) that calculates the amplitude of the friction force to the displacement frequency or of any other harmonics of the displacement frequency of the tip or the sample holder. Said signal is then injected into the AFM electronic and permits the representation of the friction force as a function of the displacement of the piezoelectric ceramic.

According to the invention, a steering card (E) is used in order to recuperate the magnitudes measured by the synchronous detector.

The steering card may also serve to set the parameters of the synchronous detector when those parameters are not set manually.

The steering card necessitates a steering software and drivers.

For example, a PCI-GPIB NI 488.2-type steering card may be used.

According to an embodiment, the measurements of the adhesion or friction forces are logged on a XY grid and therefore permit the acquisition of a collection of spectrums and the establishment of a map in force mode.

Furthermore, the numerous advantages provided by the continuous uniform curvilinear mode described in the present invention make this mode particularly appropriate for interaction studies between molecules such as ligand/receptor, antibody/antigen, DNA/protein interactions.

That is why, another object of the invention concerns the use of the measurement processes of the invention in the fields of metrology, material sciences, biology, biochemistry, biotechnologies, micro-nanosciences and micro-nanotechnologies.

Furthermore, the continuous uniform curvilinear mode also enables one to access wear parameters such as the Archard coefficient, by putting the tip in contact with the surface of a sample in relative continuous curvilinear movement during important time periods and by varying the normal forces. It is then possible to measure the worn volumes as a function of time and the different normal forces.

FIG. 8 illustrates such a surface wear phenomenon.

Another object of the invention therefore concerns the use of the scanning probe microscope of the invention in the surface wear and abrasion field.

In the case of a surface modification process (wear, abrasion, lithography, oxidation, electrochemical deposit, etc.), the scanning probe microscope of the invention can comprise a supplemental piezoelectric actuator such that an actuator be devoted to positioning the probe at the place where the modification must be realized and that the second actuator generates the curvilinear displacement permitting the modification.

The scanning probe microscope of the invention may also be used as a means permitting an oxidation or a deposit where, under the action of an electric current, the atoms of the tip will be deposited on the surface to be treated.

It is also to be noted that the continuous curvilinear mode of the invention in applications such as nanotooling, nanopolishing, nanolithography or tribology.

EXAMPLES

The invention is illustrated with the help of examples, which are given for illustrative purposes only and should not in any way be considered limitative.

Example 1

Influence of the Slip Speed on the Capillary Adhesion

The interaction forces between a gold surface and a $Si_3N_4$ tip (for which the stiffness of the cantilever is calibrated by the thermal sound) were measured in circular mode with approach and withdrawal.

The thin gold layer was deposited on a glass substrate, said glass substrate having been treated with a thin titanium layer necessary in order to favour the adherence of the gold on the glass.

During these measurements, a sinusoid tension set at a frequency of 100 Hz and of variable amplitude (representative of the imposed value for the speed) was applied to the piezoelectric actuators of the probe.

Figure 6:
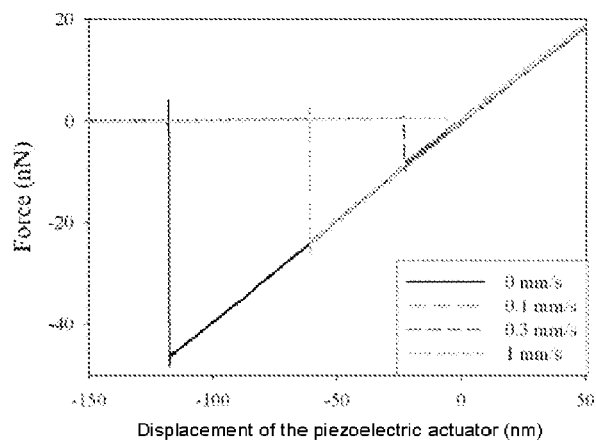
FIG. 6 represents the deflection of the cantilever as a function of the vertical displacement of the actuator and illustrates example 1 of the present invention.

FIG. 6 represents the deflection of the cantilever in relation to the displacement Z of the piezoelectric actuator during the approach and the withdrawal of the sample in relation to the tip, for different tension amplitude values and thus different rotational speed values.

The curve at 0V is representative of the state of the art because it corresponds to a situation where the sample holder and the probe holder are still in the X-Y axes. During the withdrawal, the tip recedes from the surface, the repulsion forces produce a deflection of the cantilever (part A of the curve) until the adhesion is disrupted (jump B) and that the cantilever is liberated from the surface (part C) where the interaction forces between tip and surface are nil.

The observed discontinuity (jump B) is representative of the adhesion between the probe and the sample encompassing the contribution of the capillary forces due to the meniscus linked to the humidity of the surrounding environment (RH>30%).

The group of other curves, at speeds not equal to zero, systematically makes appear a reduction of the influence of this phenomenon, even more so when the imposed rotational speed (or tension) is elevated.

Example 2

Determination of the Friction Coefficients

Measurements have been realized with the help of an atomic force microscope as described in the present invention according to a circular mode ($A_i=A'_i$; identical frequency; $\phi=\pi/2$) with approach-withdrawal cycles.

The measurements were made at a constant slide speed equal to 720 μm/s corresponding to a tension of 8V.

FIG. 7a represents the normal forces as a function of the displacement of the actuator along the Z axe during the contact phase of the tip with the surface during the cycles.

FIG. 7b represents the friction forces as a function of the displacement of the actuator along the Z axe.

During these measurements, the acquisition of the friction and interaction forces was realized simultaneously. The guiding coefficient right part of FIG. 7b enables one to directly obtain the friction coefficient.

The invention claimed is:

1. An atomic force microscopy measurement process, comprising the following steps:
   (a) to contact a surface of a sample to be analyzed with a probe for atomic force microscopy;
   (b) to put in relative continuous curvilinear movement at a given frequency said surface of the sample relative to the probe in the plane of the surface of the sample to be analyzed;
   (c) to detect for a given continuous and constant sliding velocity the lateral forces induced by the friction forces exerted between said surface of the sample to be analyzed and said tip for atomic force microscopy.

2. The measurement process according to claim 1, further comprising the following steps:
   (d) after step c) displace the probe or the sample holder to another coordinate (x,y) with the help of piezoelectric actuators;
   (e) repeat steps a), b) and c)
   (f) eventually repeat steps (d) and (e).

3. The measurement process according to claim 1, wherein the relative continuous curvilinear movement is uniform.

4. The measurement process according to claim 3, wherein the curvilinear movement is a circular movement.

5. The measurement process according to claim 1, wherein the sample is adjusted in order for the continuous curvilinear movement to be performed in the plane of the sample surface.

6. The measurement process according to claim 1, wherein the probe vibrates around its resonance frequency during the whole measurement.

7. An atomic force microscope that permits the implementation of the processes according to claim 1, wherein said microscope comprises a probe linked to the microscope via a probe holder, a sample holder and means permitting the relative displacement of the sample holder and the probe holder, wherein during the measurement, these displacement means generate the relative continuous curvilinear movement between the sample holder and the probe holder.

8. An atomic force microscope according to claim 7, wherein said displacement means also help generate a relative movement along the Z-axis between the tip and the sample holder, said movement being appreciatively normal at the free end of the sample holder.

9. Atomic force microscope according to claim 7, wherein the displacement means are the piezoelectric actuators of the probe holder or the sample holder.

10. An atomic force microscope according to claim 7, wherein the relative curvilinear uniform movement is generated by the application on the displacement means of two harmonic voltage X and Y composed of sinusoidal voltages of frequency f and of its harmonics i·f (with i integer), of respective amplitudes $A_i$ and $A'_i$, said harmonics of voltage X and Y being phase shift by an angle φ.

11. An atomic force microscope according to claim 7, wherein the tensions X, Y are composed of a single harmonic which presents the same amplitude and the same frequency and are phase shift one from the other by an angle equal to π/2.

12. A device permitting the implementation of the atomic force microscope according to claim 7, which comprises means for controlling said means enabling the displacement.

13. A device according to claim 12, wherein it is directly connected to an atomic force microscope.

14. A device permitting the implementation of the atomic force microscope according to claim 7, which comprises the following elements:
   a computer comprising a software that enables the generation of virtual digital sinusoidal voltages (A);
   a digital-to-analog converter (B);
   optionally, a voltage inverter (C);
   a module that helps get access to the signals or any other system that permits the application of electrical voltages to the piezoelectric actuators (D);
   a lock-in amplifier (E);
   optionally, a steering card (F).

15. An atomic force microscopy measurement process implemented by the device as defined in claim 14 to detect harmonics consisting of phase and amplitude of the lateral forces.

16. A method comprising a step consisting of applying the measurement process according to claim 1 in order to detect the adhesion and/or the repulsion forces as a function of the sliding velocity.

17. A method comprising a step of modifying the surfaces by wear and/or by modification and/or by chemical deposit, by using the atomic force microscope as defined in claim 7.

18. A method comprising a step consisting of applying the measurement process according to claim 1 in order to measure friction forces as a function of the normal forces and thereby determine friction coefficients and this for different continuous and constant sliding velocities.

19. A method comprising a step consisting of applying the measurement process according to claim 1 in order to do adhesion force or friction force or friction coefficient mapping of the analyzed surface.

20. A method comprising a step consisting of applying the measurement process according to claim 1 in the fields of metrology, material sciences, biology, biochemistry, biotechnologies, micro-nanotechnologies and tribology.

21. A method comprising a step consisting of applying the measurement process according to claim 1 in nanotooling, nanopolishing or nanolithography.

22. An atomic force microscopy measurement process, comprising the following steps:
   (a) to contact a surface of a sample to be analyzed with a tip of a probe for atomic force microscopy;
   (b) to put in relative continuous curvilinear movement at a given frequency said surface of the sample relative to the tip while applying simultaneously to said surface another relative movement along the Z-axis, said movement being appreciatively normal to the surface of the sample;
   (c) to detect the interactions forces exerted between said surface to be analyzed and said tip for atomic force microscopy thereby enabling one to access the adhesion forces during the withdrawal of the tip from the surface or inversely.

23. The measurement process according to claim 22, further comprising the following steps:
   (d) after step c) displace the probe or the sample holder to another coordinate (x,y) with the help of piezoelectric actuators;
   (e) repeat steps a), b) and c)
   (f) eventually repeat steps (d) and (e).

24. The measurement process according to claim 22, wherein the relative continuous curvilinear movement is uniform.

25. The measurement process according to claim 24, wherein the curvilinear movement is a circular movement.

26. The measurement process according to claim 22, wherein the sample is adjusted in order for the continuous curvilinear movement to be performed in the plane of the sample surface.

27. The measurement process according to claim 22, wherein the probe vibrates around its resonance frequency during the whole measurement.

28. An atomic force microscopy measurement process, comprising the following steps:
   (a) to contact a surface of a sample to be analyzed with a tip of a probe for atomic force microscopy;
   (b) to put in relative continuous curvilinear movement at a given frequency said surface of the sample relative to the tip while applying simultaneously to said surface another relative movement along the Z-axis, said movement being appreciatively normal to the surface of the sample;
   (c) to detect for a given continuous and constant sliding velocity the friction forces as a function of the normal forces imposed during the approach-withdrawal cycles and when the tip is in contact with the surface of the sample.

29. An atomic force microscope that permits the implementation of the processes according to either claim 22 or claim 28, wherein said microscope comprises a probe linked to the microscope via a probe holder, a sample holder and means permitting the relative displacement of the sample holder and the probe holder, wherein during the measurement, these displacement means generate the relative continuous curvilinear movement between the sample holder and the probe holder.

30. Atomic force microscope according to claim 29, wherein said displacement means also help generate a relative movement along the Z-axis between the tip and the sample holder, said movement being appreciatively normal at the free end of the sample holder.

31. An atomic force microscope according to claim 29, wherein the displacement means are the piezoelectric actuators of the probe holder or the sample holder.

32. An atomic force microscope according to claim 29, wherein the relative curvilinear uniform movement is generated by the application on the displacement means of two harmonic voltages X and Y composed of sinusoidal voltages of frequency f and of its harmonics i·f (with i integer), of respective amplitudes $A_i$ and $A'_i$, said harmonics of voltages X and Y being phase shift by an angle $\phi$.

33. An atomic force microscope according to claim 29, wherein the voltages X, Y are composed of a single harmonic which presents the same amplitude and the same frequency and are phase shift one from the other by an angle equal to $\pi/2$.

34. A device permitting the implementation of the atomic force microscope according to claim 29, which comprises means for controlling said means enabling the displacement.

35. A device according to claim 34, wherein it is directly connected to an atomic force microscope.

36. A device permitting the implementation of the atomic force microscope according to claim 29, which comprises the following elements:
   a computer comprising a software that enables the generation of virtual digital sinusoidal voltages (A);
   a digital-to-analog converter (B);
   optionally, a voltage inverter (C);
   a module that helps get access to the signals or any other system that permits the application of electrical voltages to the piezoelectric actuators (D);
   a lock-in amplifier (E);
   optionally, a steering card (F).

37. An atomic force microscopy measurement process implemented by the device as defined in claim 36 to detect harmonics consisting of phase and amplitude of the lateral forces.

38. A method comprising a step consisting of applying the measurement process according to claim 22 in order to detect the adhesion and/or the repulsion forces as a function of the sliding velocity.

39. A method comprising a step of modifying the surfaces by wear and/or by modification and/or by chemical deposit, by using the atomic force microscope as defined in claim 29.

40. A method comprising a step consisting of applying the measurement process according to claim 22 in order to measure friction forces as a function of the normal forces and thereby determine friction coefficients and this for different continuous and constant sliding velocities.

41. A method comprising a step consisting of applying the measurement process according to claim 22 in order to do adhesion force or friction force or friction coefficient mapping of the analyzed surface.

42. A method comprising a step consisting of applying the measurement process according to claim 22 in the fields of metrology, material sciences, biology, biochemistry, biotechnologies, micro-nanotechnologies and tribology.

43. A method comprising a step consisting of applying the measurement process according to claim 22 in nanotooling, nanopolishing or nanolithography.

44. An atomic force microscopy measurement process, comprising the following steps:
- (a) to contact a surface of a sample to be analyzed with a tip of a probe for atomic force microscopy;
- (b) to put in relative continuous curvilinear movement at a given frequency said surface of the sample relative to the tip while applying simultaneously to said surface another relative movement along the Z-axis, said movement being appreciatively normal to the surface of the sample;
- (c) to detect for a given continuous and constant sliding velocity the interactions forces exerted between said surface to be analyzed and said tip for atomic force microscopy thereby enabling one to access the adhesion forces during the withdrawal of the tip from the surface or inversely, and the friction forces as a function of the normal forces imposed during the approach-withdrawal cycles and when the tip is in contact with the surface of the sample.

* * * * *